US011910162B2

(12) United States Patent
Rosenkranz et al.

(10) Patent No.: US 11,910,162 B2
(45) Date of Patent: Feb. 20, 2024

(54) METHOD AND DEVICE FOR FREQUENCY-SELECTIVE PROCESSING OF AN AUDIO SIGNAL WITH LOW LATENCY

(71) Applicant: Sivantos Pte. Ltd., Singapore (SG)

(72) Inventors: Tobias Daniel Rosenkranz, Bubenreuth (DE); Henning Puder, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 83 days.

(21) Appl. No.: 17/748,550

(22) Filed: May 19, 2022

(65) Prior Publication Data

US 2022/0386042 A1 Dec. 1, 2022

(30) Foreign Application Priority Data

May 21, 2021 (DE) ..................... 10 2021 205 251.7

(51) Int. Cl.
*H04R 25/00* (2006.01)
*G10L 21/0232* (2013.01)

(52) U.S. Cl.
CPC ........ *H04R 25/505* (2013.01); *G10L 21/0232* (2013.01); *H04R 2430/03* (2013.01)

(58) Field of Classification Search
CPC .............. H04R 25/505; H04R 2430/03; H04R 2430/01; H04R 25/353; H04R 25/35; H04R 25/00; G10L 21/0232
(Continued)

(56) References Cited

U.S. PATENT DOCUMENTS 4,852,175 A * 7/1989 Kates .................. H04R 25/356 381/317
8,085,960 B2 * 12/2011 Alfsmann .............. H04R 25/50 381/323
(Continued)

FOREIGN PATENT DOCUMENTS

CN 111128174 A 5/2020
DE 102010026884 A1 1/2012
(Continued)

OTHER PUBLICATIONS

Schuijers, et al., Low Complexity Parametric Stereo Coding. In: Audio Engineering Society Convention 116, May 2004.

*Primary Examiner* — Xu Mei
(74) *Attorney, Agent, or Firm* — Laurence A. Greenberg; Werner H. Stemer; Ralph E. Locher

(57) ABSTRACT

A method for processing an input audio signal includes using a first analytical filter bank to divide the input audio signal in a first frequency splitting process into a plurality of first frequency bands. The first frequency bands of a first subgroup are divided in a further frequency splitting process by a further analytical filter bank into a plurality of frequency subbands. The divided input audio signal is frequency-selectively processed or amplified. The divided and processed input audio signal is then combined again into an output audio signal. A prediction is applied to the first frequency bands of the first subgroup and/or the frequency subbands derived therefrom, to compensate for latency differences between the first frequency bands and the frequency subbands as a result of the or each further frequency splitting process. A device or hearing aid for carrying out the method is also provided.

16 Claims, 4 Drawing Sheets

(58) Field of Classification Search
USPC ........ 381/312, 316, 320, 98, 94.3, 94.2, 103
See application file for complete search history.

(56) References Cited

U.S. PATENT DOCUMENTS

| | | | | |
|---|---|---|---|---|
| 8,150,081 | B2 | 4/2012 | Alfsmann | |
| 8,908,893 | B2 * | 12/2014 | Alfsmann | H04R 25/505 381/322 |
| 8,948,424 | B2 | 2/2015 | Gerkmann et al. | |
| 10,142,741 | B2 | 11/2018 | Aubreville et al. | |
| 10,674,283 | B2 * | 6/2020 | Rosenkranz | H04R 25/353 |
| 2002/0085654 | A1 * | 7/2002 | Cvetkovic | H03H 17/0266 375/350 |
| 2009/0290737 | A1 | 11/2009 | Alfsmann | |
| 2010/0094643 | A1 | 4/2010 | Avendano et al. | |
| 2015/0264478 | A1 * | 9/2015 | Aubreville | H04R 25/407 381/317 |
| 2019/0333530 | A1 * | 10/2019 | Rosenkranz | H04R 1/1083 |

FOREIGN PATENT DOCUMENTS

| | | | |
|---|---|---|---|
| EP | 3197181 | A1 | 7/2017 |
| EP | 2124335 | B1 | 3/2018 |

* cited by examiner

METHOD AND DEVICE FOR FREQUENCY-SELECTIVE PROCESSING OF AN AUDIO SIGNAL WITH LOW LATENCY

CROSS-REFERENCE TO RELATED APPLICATION

This application claims the priority, under 35 U.S.C. § 119, of German Patent Application DE 10 2021 205 251.7, filed May 21, 2021; the prior application is herewith incorporated by reference in its entirety.

FIELD AND BACKGROUND OF THE INVENTION

The invention relates to a method for processing an input audio signal, in particular in a hearing aid, wherein:

- the input audio signal is divided into a plurality of first frequency bands in a first frequency splitting process by using a first analytical filter bank,
- the first frequency bands of a first subgroup of the first frequency bands is divided into a plurality of frequency subbands in at least one further frequency splitting process by using at least one further analytical filter bank,
- the input audio signal that is divided into the first frequency bands or the frequency subbands, is processed, in particular amplified, in a frequency-selective manner, and
- the input audio signal that is divided into the first frequency bands or the frequency subbands and processed in a frequency-selective manner is then combined again into an output audio signal.

The invention also relates to a device, in particular in a hearing aid, including:

- a first analytical filter bank configured to divide the input audio signal into a plurality of first frequency bands in a first frequency splitting process,
- at least one further analytical filter bank downstream of the first analytical filter bank, configured to divide the first frequency bands of a first subgroup of the first frequency bands into a plurality of frequency subbands in at least one further frequency splitting process,
- a signal processing unit for frequency-selective processing, in particular amplification, of the input audio signal that has been divided into the first frequency bands or the frequency subbands, and
- a synthetic filter bank apparatus downstream of the signal processing unit, configured to combine the input audio signal that has been divided into the first frequency bands or the frequency subbands and processed in a frequency-selective manner into an output audio signal.

Such a method and such a device are known from European Patent EP 2 124 335 B1, corresponding to U.S. Pat. No. 8,150,081. The device is in particular a hearing aid.

The terms "hearing aid" or "hearing apparatus" generally refer to an electronic device that assists the hearing capacity of a person (referred to below as the "wearer" or "user") who is wearing the hearing aid. The invention relates in particular to hearing aids that are configured to fully or partially compensate for hearing loss of a user with impaired hearing. Such a hearing aid is also known as a "hearing device." In addition, there are hearing aids that protect or improve the hearing capacity of users with normal hearing, for example to enable an improved understanding of speech in complex hearing situations. Hearing aids further also include headphones or other sound reproduction devices that submerge an environmental noise in another audio signal (e.g. music or a telephone conversation) or that reduce the perceptibility of the environmental noise through active noise suppression.

Hearing aids in general, and hearing devices in particular, are in most cases configured to be worn at the head and in this case, in particular, in or at an ear of the user, in particular as a "behind the ear" (BTE) device or as an "in the ear" (ITE) device. In terms of their internal structure, hearing aids generally include at least one (acousto-electric) input transducer, a signal processor and an output transducer. During operation of the hearing aid, the, or each, input transducer receives airborne sound from the environment of the hearing aid and converts this airborne sound into an input audio signal (i.e. an electrical signal that transports the information regarding the environmental sound). The input audio signal or signals is or are processed in the signal processor (i.e. modified in respect of its sound information) in order to assist the hearing capacity of the user, in particular in order to compensate for a hearing loss of the user. The signal processing unit outputs a correspondingly processed audio signal (also known as the "output audio signal" or "modified sound signal") to the output transducer.

In most cases, the output transducer is configured as an electro-acoustic transducer that converts the (electrical) output audio signal again into airborne sound, wherein this airborne sound—which has been modified in comparison with the environmental sound—is output into the hearing canal of the user. In the case of a hearing aid worn behind the ear, the output transducer, also known as the "earphone" (or "receiver"), is usually integrated into a housing of the hearing aid outside the ear. The sound that is output from the output transducer is guided in this case into the hearing canal of the user by using a sound tube. As an alternative to this, the output transducer can also be disposed in the hearing canal, and thus outside the housing that is worn behind the ear. Such hearing aids are also referred to as RIC devices (for "receiver in canal"). Hearing aids worn in the ear, having dimensions which are so small that they do not protrude outside above the hearing canal, are also referred to as CIC devices (for "completely in canal").

In further configurations, the output transducer can also be implemented as an electromechanical transducer that converts the output audio signal into structure-born sound (vibrations), wherein this structure-born sound is, for example, output into the skull bone of the user. There are, furthermore, implantable hearing aids, in particular cochlear implants, and hearing aids having an output transducer which directly stimulates the auditory nerve of the user.

For the purposes of signal processing, the input audio signal is regularly divided in a hearing aid into a plurality of frequency bands by using an analytical filter bank. In other words, the input audio signal is converted into a plurality of partial band signals that are passed, separately from one another, into frequency channels, each of which is processed, in particular amplified, in a specific manner. By using a synthetic filter bank, the processed partial band signals are then again assembled into the output audio signal including all the frequency components.

An important aspect of the processing of an audio signal, in particular in a hearing aid, is, on the one hand, the latency, i.e. the time delay of the audio signal caused by the processing. The latency should appropriately be less than 10 milliseconds (ms), since a greater latency would noticeably impair the hearing experience of a human user of the hearing aid. On the other hand, for some, signal processing functions such as, for example, noise reduction or dynamic compression, a high frequency resolution is helpful, i.e. a division of the audio signal into a large number of frequency bands each having only a narrow bandwidth.

Those two demands, however, conflict with one another, since the product of time and frequency resolution is constant (Küpfmüller's uncertainty principle). In practice, the minimum technically appropriate bandwidth is thus limited by the maximum tolerable latency, as a result of which in some cases a satisfactory signal processing is made more difficult or is prevented.

Thus, for example, for a good noise reduction of voiced speech, a frequency interval between adjacent frequency bands that corresponds to at most half of the fundamental frequency would be desirable. Even for female voices, in which the fundamental frequency of voiced sounds lies typically between 200 hertz (Hz) and 300 Hz, the desirable frequency interval of between 100 Hz and 150 Hz can, however, not be achieved, since it would be associated with too high a latency. In conventional hearing aids, therefore, an acceptable, though not fully satisfactory, compromise between the highest possible frequency resolution and the lowest possible latency of between 200 Hz and 500 Hz is typically realized.

Filter banks in which the frequency bands have a non-uniform frequency interval, namely increasing continuously or in steps with rising frequency, are sometimes employed to solve this problem. A two-stage analytical filter bank apparatus for a hearing apparatus is thus disclosed in European Patent EP 2 124 335 B1, corresponding to U.S. Pat. No. 8,150,081, in which the audio signal to be processed is divided by a first filter bank into four first frequency bands and then further into 24 second frequency bands by second filter bank. Of the 24 second frequency bands, the lower 12 frequency bands have a significantly lower frequency interval and a lower bandwidth than the upper 12 frequency bands.

As a result of the non-uniform frequency distribution of the known analytical filter bank apparatus, the disadvantages resulting from the high frequency-splitting are reduced, since an increased latency only occurs in a partial region of the sound spectrum. This advantage is, however, obtained at the cost of a poorer sound quality, since the output audio signal is distorted as a result of different, greater latencies and different group transit times in the low-frequency and high-frequency frequency channels. In addition, each partial band in non-uniform filter banks typically has a different bandwidth. A possible under-sampling must, however, be oriented to the band with the highest bandwidth. This gives rise to a comparatively ineffective signal processing.

On the other hand, a method and a device for processing an audio signal in a hearing aid is described in European Patent Application EP 3 197 181 A1, corresponding to U.S. Pat. No. 10,142,741, wherein a plurality of signal blocks are formed in the time domain from the input audio signal. These time blocks are at least partially predicted in order to reduce the latency; in other words, the progress of the signal in these time blocks is extrapolated into the future. The predicted time blocks are then divided by the filter bank into frequency bands, and thus transformed into the frequency domain. As a result of the prediction, however, the known method also leads to a noticeable impairment of the sound quality.

SUMMARY OF THE INVENTION

It is accordingly an object of the invention to provide a method and a device for frequency-selective processing of an audio signal with low latency, which overcome the hereinafore-mentioned disadvantages of the heretofore-known methods and devices of this general type and which enable a frequency-selective processing of an audio signal with low latency and high (sound) quality. A high frequency-resolution should be enabled in this case, in particular in a partial region of the audible sound spectrum.

With the foregoing and other objects in view there is provided, in accordance with the invention, a method for (frequency-specific) processing of an audio signal, in particular in a hearing aid, in which the input audio signal is first divided spectrally in a first analytical filter bank into a plurality of first frequency bands (first frequency splitting process). A first subgroup (subset) of the first frequency bands is divided in at least one further frequency splitting process by using at least one further analytical filter bank into frequency subbands (with narrower bandwidths than the first frequency bands). The input audio signal that is divided into the first frequency bands and, if relevant, in the frequency subbands, is processed, in particular amplified, in a frequency-selective manner. The input audio signal that is divided into the first frequency bands and, if relevant into the frequency subbands, and processed in a frequency-selective manner, is then combined again into an output audio signal.

According to the invention, a prediction is now applied to the more finely split part of the input audio signal (and preferably only to this part of the input audio signal), that compensates for, i.e. completely eliminates or at least reduces, a latency caused by the, or each, further frequency splitting process. In other words, latency differences between the frequency bands and the frequency subbands resulting from the, or from each, further frequency splitting process are compensated for by the prediction. In particular, the latency of the more finely frequency-divided part of the input audio signal is matched to the lower latency of a part of the input audio signal having a frequency which has been divided more coarsely.

In contrast to the method known from European Patent Application EP 3 197 181 A1, corresponding to U.S. Pat. No. 10,142,741, the prediction is applied in this case in the frequency domain. There exists a number of variant embodiments within the framework of the invention for the time point or the location at which the prediction is applied within the frequency domain. The prediction is thus either applied directly to the frequency-subbands and/or to those first frequency bands from which the frequency subbands are derived. The prediction can in this case be performed either before or after the signal processing, or even between two of in such a way that may be a plurality of processing steps. In the context of the invention the prediction can, finally, also take place in a plurality of sequential prediction steps.

A particularly fine frequency splitting process is enabled by the method described above in a partial region of the sound spectrum, while at the same time the distortion of the output signal normally entailed by non-uniform frequency splitting processes is avoided or at least reduced by the prediction. In comparison with the method known from European Patent Application EP 3 197 181 A1, corresponding to U.S. Pat. No. 10,142,741, however, the disadvantageous effect of the prediction on the sound quality is also reduced, since the prediction is only applied to a partial region of the sound spectrum. Overall, therefore, a high-frequency resolution in one partial region of the sound spectrum is achieved in combination with a particularly good sound quality.

In one preferred embodiment of the method, the frequency splitting process is carried out in two stages. A first subgroup (subset) of the first frequency bands is split in this case in a second frequency splitting process using a second analytical filter bank more finely into second frequency bands (i.e. frequency subbands of the second stage). Each first frequency band of the first subgroup is thus divided again into a plurality of these second frequency bands. The prediction is applied in this case to the second frequency bands, or to the first frequency bands of the first subgroup, in order to compensate for the latency caused by the second frequency split.

The basic concept of the method according to the invention, namely the finer frequency splitting process of a spectral part of the input audio signal, associated with a prediction of this more finely split spectral region to compensate for the latency caused by the finer frequency splitting process, is optionally extended to n-stage frequency splits (with n=3, 4, 5 . . . ). In general in this case, a subgroup of the i-th frequency bands (where i=2, 3, 4 . . . ) is subdivided into (i+1)th frequency bands of even narrower bandwidth. That part of the input audio signal that has been frequency-divided multiple times is in this case predicted in each case in the frequency domain in such a way that the latency caused by the multiple frequency division is compensated for in each case.

Thus, in a three-stage implementation of this method principle, each of the second frequency bands of a subgroup of the second frequency bands is divided in a third frequency splitting process by using a third analytical filter bank into a plurality of third frequency bands (i.e. frequency subbands of the third stage). The prediction is applied in this case to the third frequency bands and/or to the second frequency bands from which the third frequency bands have been derived, and/or to the first frequency bands from which the third frequency bands have been derived, in such a way that the latency caused by the second and third frequency splitting processes is compensated for.

The first subgroup of the first frequency bands is preferably selected in such a way that it covers a contiguous low-frequency range of the sound spectrum, in particular the bottom 2 to 3 kHz of the sound spectrum. The first subgroup of the first frequency bands is, in other words, preferably formed of a plurality of the first frequency bands having respective center frequencies which are immediately adjacent and that include the lowest first frequency band. This is particularly advantageous, in particular for processing audio signals that contain human speech. This is because on the one hand, the sound components of speech sound, in particular in the case of voiced sounds, dominate in this low frequency range, and on the other hand, the frequency resolution of human hearing is also particularly high at low frequencies.

Fundamentally, the method can be employed with a conventional multi-stage filter bank as is, for example, known from European Patent EP 2 124 335 B1, corresponding to U.S. Pat. No. 8,150,081. Preferably, the, or each, further analytical filter bank, however, only acts on the first subgroup of the first frequency bands. A second subgroup of the first frequency bands is, on the other hand, preferably subjected to the frequency-selective processing, in particular amplification, without any further frequency splitting process. On the whole, a particularly low latency is achieved in this way.

A particularly efficient frequency splitting process and processing of the input audio signal is achieved in an advantageous embodiment of the invention in that the first frequency bands have a consistent first bandwidth, i.e. one that is the same for all the first frequency bands. For the same reason—additionally or alternatively—the i-th frequency bands (where i=2, 3 . . . ) are preferably so configured that these i-th frequency bands each have a consistent bandwidth, i.e. one that is the same for all of the i-th frequency bands. The first bandwidth in this case is, in particular, an integral multiple of the second bandwidth; the second bandwidth, if it exists, is an integral multiple of the third bandwidth, and so forth.

Basically, the part of the input audio signal that is more finely divided in frequency is predicted linearly in the context of the invention. Preferably, however, the prediction applied to the first frequency bands of the first subgroup, or the frequency subbands derived therefrom, is a non-linear prediction.

In a particularly advantageous variant embodiment of the invention, one or more prediction algorithms are employed that can be adapted while the method is running, i.e. during the signal processing. In contrast to prediction algorithms that are configured or trained in advance, which are not adaptive (static) while the method is running, adaptive prediction algorithms are, on the one hand, very flexible and, on the other hand, sparing with resources and therefore particularly suitable for use in a hearing aid.

In appropriate embodiments of the invention, in particular at least one Hammerstein model, a recurrent neural network and/or an echo-state network is employed to carry out the prediction.

In order to reduce the negative influence of the non-uniform frequency splitting processes of the input audio signal and of the prediction of the sound quality of the output signal altogether much further, the method described previously is, in a development of the invention, only employed at certain times in situations in which it brings particular advantages, namely, in particular, when processing noise that contains voiced speech. The input audio signal is analyzed—across all frequency bands or in specific bands—for the presence of voiced speech for this purpose. The, or each, further frequency splitting process, and therefore also the prediction, are only performed on the signal path that leads to the output audio signal in at least one of the first frequency bands or frequency subbands when the presence of voiced speech is detected in the input audio signal. The, or each, further frequency splitting process and/or the prediction can optionally, however, also continue in the background of the signal processing in the absence of voiced speech without this having an effect on the output audio signal.

In addition or as an alternative, the accuracy (reliability) of the prediction can be ascertained for the same purpose—across all frequency bands or in specific bands. On the path leading to the output signal, the finer frequency splitting process of a portion of the input audio signal (i.e. the derivation of the frequency subbands), and therefore also the prediction, is again only performed in at least one of the first frequency bands or frequency subbands when the accuracy of the prediction satisfies a predefined criterion there, in particular exceeds a predefined threshold value. The, or each, further frequency splitting process and/or the prediction can optionally, however, also continue in the background of the signal processing when the prediction is inadequate, without this having an effect on the output audio signal.

With the objects of the invention in view, there is also provided a device for processing an input audio signal, in particular in a hearing aid, which includes an analytical filter bank apparatus with a first analytical filter bank and at least one further analytical filter bank. The first analytical filter bank is configured to divide the input audio signal into a plurality of first frequency bands. The at least one further analytical filter bank is downstream of the first analytical filter bank and is configured to divide each first frequency band of a first subgroup of the first frequency bands into a plurality of frequency subbands. As described above, the analytical filter bank apparatus optionally includes, in addition to a second analytical filter bank, a third analytical filter bank, further downstream, that splits the one subgroup of the second frequency bands yet more finely into third frequency bands as well, potentially, as yet one or multiple further downstream analytical filter banks.

The device further includes a signal processing unit for frequency-selective processing, in particular amplification, of the input audio signal divided into the first frequency bands or the frequency subbands, as well as a synthetic filter bank apparatus downstream of the signal processing unit that is configured to combine the input audio signal that has been divided into the first frequency bands and, where relevant, the frequency subbands, and processed in a frequency-selective manner to form an output audio signal.

According to the invention, the device includes at least one predictor that is configured to apply a prediction to the first frequency bands of the first subgroup and/or the frequency subbands derived from them, in order to compensate for latency differences between the first frequency bands and the frequency subbands as a result of the, or each, further frequency splitting process.

The signal processing unit is preferably implemented in a digital signal processor of the hearing aid. The signal processing unit can be realized within the context of the invention in the form of (non-programmable) electronic circuits. In this case the signal processor is configured, for example, as an ASIC or includes such a circuit. The signal processing unit is, alternatively, realized in the form of software. In this case, the signal processor is formed of a programmable electronic component. As a further alternative to this, the signal processing unit is formed by a combination of non-programmable circuits and software. The signal processor in this case is formed by a hybrid chip that includes at least one programmable component and at least one non-programmable component.

The synthetic filter bank apparatus is preferably configured with mirror symmetry to the analytical filter bank apparatus, and thus includes a corresponding counterpart for each analytical filter bank. The synthetic filter bank apparatus includes in particular a second synthetic filter bank that combines the second frequency bands after the signal processing again into first frequency bands, as well as a first synthetic filter bank that combines the first frequency bands into the output signal. In embodiments in which the analytical filter bank apparatus includes more than two analytical filter banks, the synthetic filter bank also preferably includes a corresponding plurality of synthetic filter banks.

The device according to the invention is in general provided and configured for automatically carrying out the method according to the invention described above. The embodiments and developments of the method described above correspond in this case to equivalent embodiments and developments of the apparatus. The embodiments of necessary and optional features of the method and their respective effects and advantages are therefore transferable to the device, and vice versa.

In preferred embodiments, the device is thus configured in such a way that:

- a second subgroup of the first frequency bands is supplied directly to the signal processing unit in order to subject the second subgroup of the first frequency bands to the frequency-selective processing without any further frequency splitting process,
- the first frequency bands and/or the subsidiary bands of the i-$^{th}$ stage (where I=2, 3, 4 . . . ) have a consistent first or i-$^{th}$ bandwidth, wherein the first bandwidth is in particular an integral multiple of the second bandwidth, and so forth,
- the at least one predictor is non-linear, and/or
- the at least one predictor is adaptive at runtime, i.e. during the signal processing.
- The apparatus optionally includes a speech detection module that is configured to analyze the input audio signal for the presence of voiced speech, as well as a switching apparatus referred to as a "signal diverter" that is configured only to activate the, or each, further analytical filter bank when the voice detection module detects the presence of voiced speech in the input audio signal.

Alternatively or in addition, the device includes a switching apparatus (signal diverter) that is identical to or different from the switching apparatus described above, that is configured to activate and deactivate the, or each, further analytical filter bank depending on the accuracy (reliability) of the prediction. The accuracy of the prediction can basically be ascertained in the context of the invention by the switching apparatus itself by analyzing each of the partial band signals supplied to the first subgroup in the first frequency bands. Preferably however, a characteristic magnitude is ascertained by the, or each, predictor for the accuracy of the prediction, and is output to the switching apparatus that activates and deactivates the second analytical filter bank depending on this magnitude. In particular, a so-called "prediction gain" is employed as the characteristic magnitude for the accuracy of the prediction.

The analytical filter bank apparatus, the synthetic filter bank apparatus, the, or each, predictor and—if present—the speech detection module and/or the, or each, switching apparatus are preferably integrated into the signal processor of the device in the form of (non-programmable) hardware and/or software. In particular, the, or each, switching apparatus can, in the context of the invention, also be a software module.

Other features which are considered as characteristic for the invention are set forth in the appended claims.

Although the invention is illustrated and described herein as embodied in a method and a device for frequency-selective processing of an audio signal with low latency, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
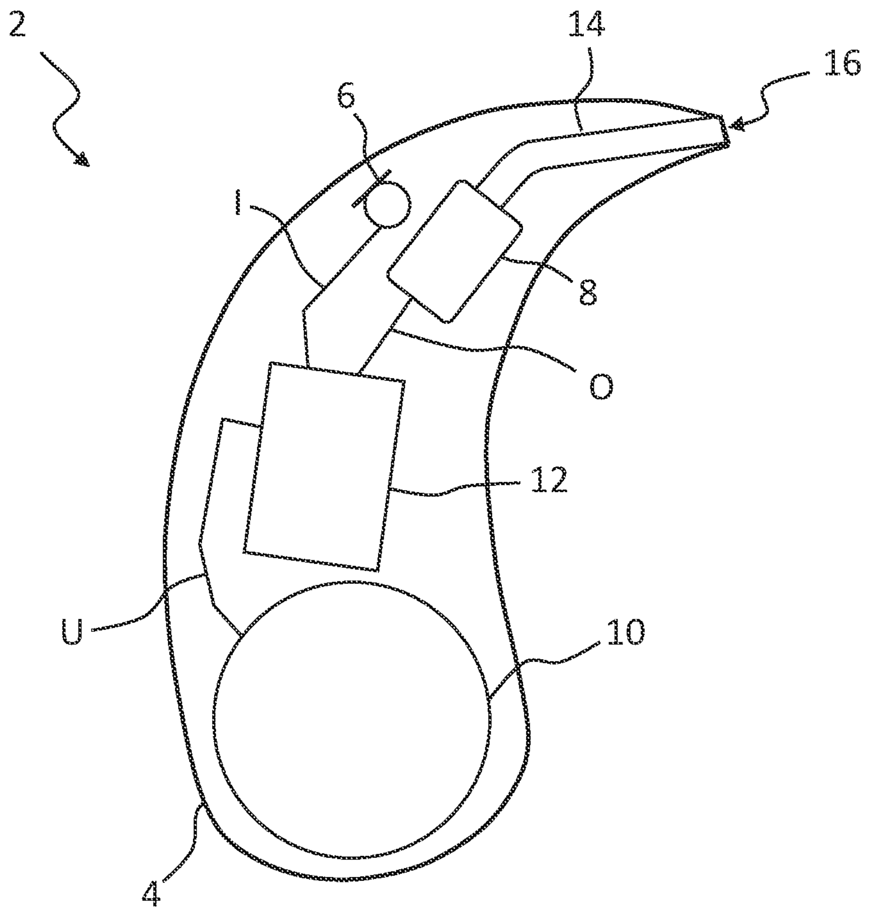
FIG. 1 is a diagrammatic, longitudinal-sectional view of a hearing aid in the form of a hearing device that can be worn behind the ear of a user.

Referring now in detail to the figures of the drawings, in which parts and values that correspond to one another are always given the same reference signs, and first, particularly, to FIG. 1 thereof, there is seen, as an example for a device according to the invention for processing an audio signal, a hearing device 2, i.e. a hearing aid configured to assist the hearing capacity of a user with impaired hearing. In the example illustrated herein, the hearing device 2 is a BTE hearing device that can be worn behind an ear of a user.

The hearing device 2 includes at least one microphone 6 as an input transducer and one earphone 8 as an output transducer inside a housing 4. The hearing device 2 further includes a battery 10 and an (in particular digital) signal processor 12. Preferably the signal processor 12 includes both a programmable subunit (a microprocessor, for example) as well as a non-programmable subunit (an ASIC, for example).

The signal processor 12 is supplied with an electrical supply voltage U from the battery 10.

In normal operation of the hearing device 2, the microphone 6 receives airborne sound from the environment of the hearing device 2. The microphone 6 converts the sound into an (input) audio signal I which contains information about the received sound. The input audio signal I is supplied to the signal processor 12 inside the hearing device 2, which modifies this input audio signal I to assist the hearing capacity of the user.

The signal processor 12 outputs an output audio signal O, which contains information about the processed and thereby modified sound, to the earphone 8.

The earphone 8 converts the output sound signal O into modified airborne sound. This modified airborne sound is transferred into the auditory canal of the user through a sound channel 14 that connects the earphone 8 to a tip 16 of the housing 4, as well as through a flexible sound tube (not shown explicitly) that connects the tip 16 to an earpiece inserted into the auditory canal of the user.

Figure 2:
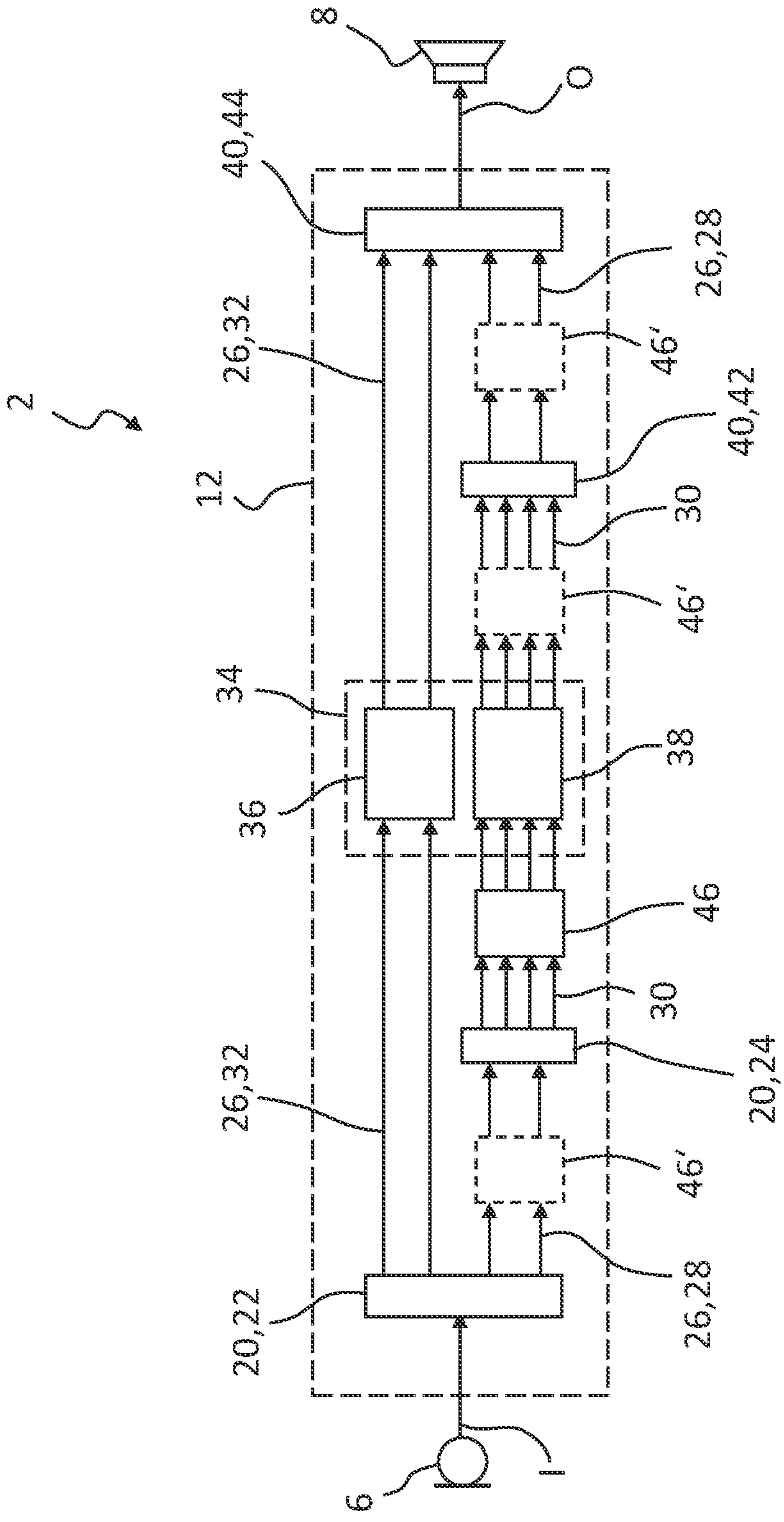
FIG. 2 is a schematic block diagram of the structure of the signal processing of the hearing aid of FIG. 1.

The functional structure of the signal processor 12 is illustrated in more detail in FIG. 2.

In a manner not shown in detail, the input audio signal I recorded by the microphone 6 is first digitized by an analog-digital converter integrated into the signal processor 12 or upstream of the signal processor 12. The digitized input audio signal I is first supplied inside the signal processor 12 to an analytical filter bank apparatus 20 which, in the example illustrated in FIG. 2, includes a first analytical filter bank 22 and a second analytical filter bank 24 downstream thereof.

By using the first analytical filter bank 22, the input audio signal I is divided in a first frequency splitting process into a plurality of first frequency bands 26, i.e. first frequency channels, each of which carries a partial band signal of the input audio signal I. For simplicity, just four first frequency bands 26 are illustrated in FIG. 2. In a useful practical implementation of the invention, the first analytical filter bank 22 divides the input audio signal I into, for example, 32 first frequency bands 26. The frequency bands 26 have a consistent (first) bandwidth of, for example, 500 Hz, and a consistent spectral spacing of 250 Hz.

The second analytical filter bank 24 only acts on a (first) subgroup 28 of the frequency bands 26, covering a range from 2 to 3 kHz at the low-frequency edge of the sound spectrum. The subgroup 28 in this case includes a number of adjacent frequency bands 26 that contain the lowest (i.e. lowest frequency) first frequency band 26. In the example illustrated in FIG. 2, the subgroup 28 includes, for example, the bottom two of the total of four frequency bands 26. In the practical implementation, the subgroup 28 includes, for example, the bottom 12 of the total of 32 first frequency bands 26.

Each first frequency band 26 of the subgroup 28 is split by the second analytical filter bank 24 in a second frequency splitting process into multiple (for example, into two, according to FIG. 2) second frequency bands 30. The frequency bands 30 have a consistent (second) bandwidth of, for example, 125 Hz, and a consistent spectral spacing of 62.5 Hz.

A second subgroup 32 of the frequency bands 26, which does not belong to the high-frequency frequency bands 26 belonging to the subgroup 28, bypasses the second analytical filter bank 24 and is thus not subject to a second (and finer) frequency splitting process.

The respective partial band signals of the high-frequency frequency bands 26 of the subgroup 32, as well as the frequency bands 30, are processed (i.e. signal-modified) in a signal processing unit 34. In the course of this processing, the respective partial band signal of one of the frequency bands 26 of the subgroup 32, as well as one of those frequency bands 30, are in particular amplified in accordance with an individual (i.e. with a predefined specific frequency) amplification factor. For the purposes of efficient signal processing, the signal processing unit 34 in the example according to FIG. 2 includes two subunits 36 and 38 for the high-frequency frequency bands 26 of the subgroup 32, or for the frequency bands 30, wherein the subunits 36 and 38 are each specifically configured for the different bandwidths of the supplied frequency bands 26 or 30 respectively.

The processed partial band signals of the high-frequency frequency bands 26 of the subgroup 32 and the frequency bands 30 are combined to form the output audio signal O by a synthetic filter bank apparatus 40. The synthetic filter bank apparatus 40 is configured with mirror symmetry to the analytical filter bank apparatus 20. It accordingly includes a second synthetic filter bank 42 that combines the second frequency bands 30 again to form the first frequency bands 26 of the subgroup 28, as well as a first synthetic filter bank 44 that combines the first frequency channels 26 of the first subgroup 28 and of the subgroup 32 to form the output audio signal O.

Through the finer frequency splitting process performed by using the analytical filter bank 24, a latency difference occurs between the low-frequency partial band signals of the frequency bands 26 of the subgroup 28 as compared with the high-frequency partial band signals of the frequency bands 26 of the subgroup 32, which would, in the absence of further measures, lead to a distortion of the output audio signal O.

In order to compensate for this latency difference (i.e. to eliminate it entirely or at least to reduce it) a predictor 46 is connected into the signal path of the frequency bands 30. The predictor 46 is preferably configured as a non-linear predictor that is continuously adaptable during operation of the hearing device 2, in particular as a Hammerstein model. The predictor 46 has parameters specifically adapted to each supplied frequency band 30.

In contrast to the method known from European Patent Application EP 3 197 181 A1, corresponding to U.S. Pat. No. 10,142,741, the prediction in the hearing device 2 takes place in the frequency domain, and is applied exclusively to the more finely frequency-divided low-frequency part of the sound spectrum. In the frequency domain, i.e. between the first analytical filter bank 22 and the first synthetic filter bank 44, the predictor can, however, be disposed at various positions. In the example according to FIG. 2, the predictor 46 is connected between the second analytical filter bank 24 and the subunits 38 of the signal processing unit 34. In FIG. 2, furthermore, three alternative positions are given for the predictor (indicated therein with the reference signs 46'), namely:

- between the first analytical filter bank 22 and the second analytical filter bank 24,
- between the subunit 38 of the signal processing unit 34 and the second synthetic filter bank 42, and
- between the second synthetic filter bank 42 and the first synthetic filter bank 44.

In one possible modification of the embodiment illustrated in FIG. 2, the hearing device 2 contains multiple predictors 46, 46' connected in series, disposed in particular at a plurality of the positions given in feet. 2, each compensating for a part of the latency difference described above.

The output audio signal O output from the first synthetic filter bank 44 is converted back into an analog signal by a digital-analog converter (not shown in more detail) that is integrated into the signal processor 12 or is downstream of the signal processor 12, and is supplied to the earphone 8 for output to the user of the hearing device 2.

Figure 3:
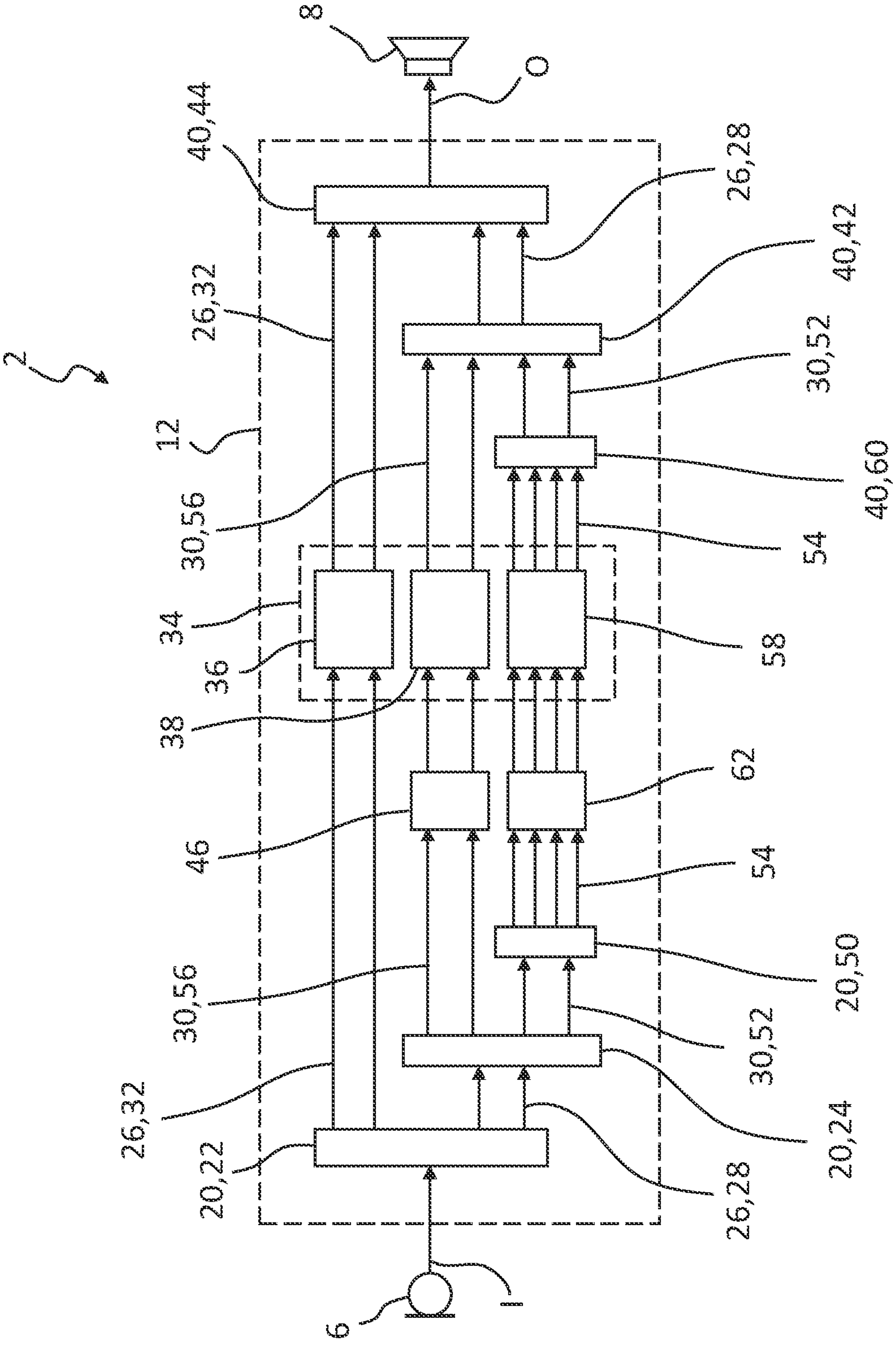
FIGS. 3 and 4 each show a schematic block diagram, illustrated in accordance with FIG. 2, of two alternative embodiments of the hearing aid.

An alternative embodiment of the hearing device 2 is illustrated in FIG. 3, in which the analytical filter bank apparatus 20 and the synthetic filter bank apparatus 40 are each built with three stages. In addition to the first analytical filter bank 22 and the second analytical filter bank 24, the analytical filter bank apparatus 20 in this embodiment includes a third analytical filter bank 50 that acts on a (first) subgroup 52 of the frequency bands 30. The subgroup 52 in turn covers a low-frequency part of the sound spectrum that altogether extends over the frequency band 30. For example, the subgroup 52 in particular includes—in the example according to FIG. 3—the bottom two of the total of four frequency bands 30; in the practical implementation, the subgroup 52 includes, for example, the bottom six of the total of 12 second frequency bands 30.

Each second frequency band 30 of the subgroup 52 is split by the third analytical filter bank 50 in a second, yet finer, frequency splitting process into multiple (for example, into two, according to FIG. 3) third frequency bands 54 (third frequency splitting process). The frequency bands 54 have a consistent (third) bandwidth of, for example, 62.5 Hz, and a consistent spectral spacing of 31.25 Hz.

A second subgroup 56 of the frequency bands 30, which does not belong to the high-frequency frequency bands 30 belonging to the subgroup 52, bypasses the third analytical filter bank 50 and is thus not subject to a third frequency splitting process.

In the embodiment of the hearing device 2 according to FIG. 3, the subunit 38 of the signal processing unit 34 only processes the respective partial band signals of the high-frequency frequency bands 30 of the second subgroup 56. For the processing, in particular the frequency-selective amplification, of the partial band signals of the frequency bands 54, the signal processing unit 34 also includes, according to FIG. 3, a further subunit 58 that is configured for the bandwidth of the frequency bands 54.

The synthetic filter bank apparatus 40 is, also in the embodiment according to FIG. 3, configured with mirror symmetry to the analytical filter bank apparatus 20. In addition to the first synthetic filter bank 44 and the second synthetic filter bank 42 it therefore also includes a third synthetic filter bank 60 that combines the third frequency bands 54 back into the second frequency bands 30 of the subgroup 52 after the signal processing.

In the embodiment of the hearing device 2 according to FIG. 3, predictor 46 only acts on the respective partial band signals of the high-frequency frequency bands 30 of the second subgroup 56. In order to predict the partial band signals of the low-frequency second frequency bands 30 of the first subgroup 52 and of the third frequency bands 54, the hearing device 2 according to FIG. 3 includes a further predictor 62. The predictor 62 is preferably of the same type as the predictor 46, but is configured in such a way that it compensates for the latency difference of the partial band signals of the high-frequency first frequency bands 26 of the subgroup 32 caused by the second and third frequency splitting processes.

The predictor 62 can also be disposed at different positions between the second analytical filter bank 24 and the second synthetic filter bank 42. Furthermore, in variants of the embodiment according to FIG. 3, multiple predictors 62 can also be connected in series, each of which compensates for a part of the latency difference. In a further variant embodiment, the predictors 46 and 62 are connected in series with one another. In this case the predictor 46 is disposed between the first analytical filter bank 22 and the second analytical filter bank 24, or between the second synthetic filter bank 42 and the first synthetic filter bank 44. In these cases, the predictor 62 is configured in such a way that it only compensates for the latency difference caused by the third frequency splitting process.

Figure 4:
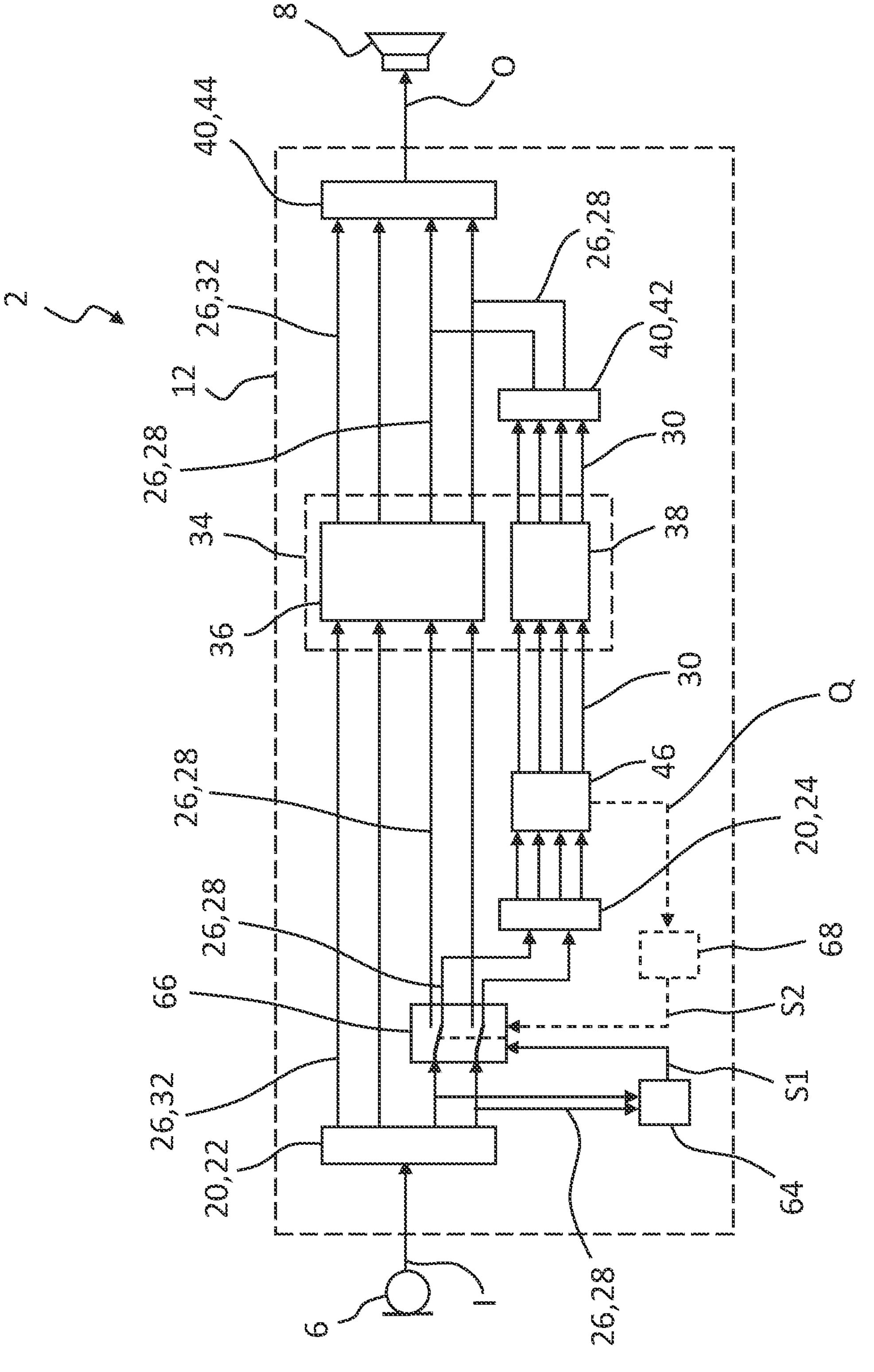

FIG. 4 shows a further embodiment of the hearing device 2, which corresponds substantially to the embodiment according to FIG. 2. In contrast to the embodiment according to FIG. 2, the second frequency splitting process of the low-frequency first frequency bands 26 of the subgroup 28 however only takes place when the input audio signal I contains voiced speech (i.e. voice sounds that are spoken or sung).

A speech detection module 64 is implemented for this purpose in the signal processor 12. The speech detection module 64 detects the presence of voiced speech by analyzing the input audio signal I that has been divided into the first frequency bands 26, and in particular the low-frequency parts thereof. In the illustrated example, the frequency bands 26 of the subgroup 28 are supplied as the input variable to the speech detection module 64. The speech detection module 64 detects the presence of voiced speech in this case, in particular through the presence of a marked fundamental frequency and/or the occurrence of characteristic dominant frequencies (formants) that are characteristic of voiced speech. When voiced speech is detected in the input audio signal I, the voice detection module outputs a control signal S1.

In order to only perform the second frequency splitting process when voiced speech has been detected, a signal switch 66 is connected in the signal path of the frequency bands 26 of the subgroup 28, and passes the partial band signals of the frequency bands 26 of the subgroup 28 either to the second analytical filter bank 24 or to the subunit 36 of the data processing unit 34 depending on the control signal S1. When the control signal S1 is applied (and thus when voiced speech has been detected in the input audio signal I)

the signal switch 66 passes the partial band signals of the frequency bands 26 of the subgroup 28 to the second analytical filter bank 24. In this case, the function of the hearing device 2 of FIG. 4 corresponds to the embodiment illustrated in FIG. 2. If, on the other hand, the control signal S1 is not applied to the signal switch 66 (meaning that voiced speech is not detected in the input audio signal I by the speech detection module 64), the signal switch 66 instead passes the partial band signals of the frequency bands 26 of the subgroup 28 directly to the subunit 36 of the data processing unit 34. In this case the partial band signals of all the first frequency bands 26 are processed without any further frequency splitting process, and amplified, in particular in a frequency-specific manner. Prediction, again, does not occur in this case.

In an alternative variant embodiment of the hearing device 2 of FIG. 4, the second frequency splitting process is not activated depending on the detection of voiced speech, but depending on the accuracy (reliability) of the prediction. In this case the predictor 46 outputs a magnitude Q that is characteristic for the accuracy of the prediction, in particular in such a way that is known as the "predictor gain" which is given in decibels by the variance $\sigma_x^2$ of the input signal of the predictor 46 in relation to the variance of the prediction error $\sigma_e^2$.

$$Q[\mathrm{dB}] = 10\log_{10}\left(\frac{\sigma_x^2}{\sigma_e^2}\right)$$

If—as shown in FIG. 4—a plurality of partial band signals is supplied to the predictor, the characteristic magnitude Q is calculated from the mean value, the minimum value or the maximum value of the individual, band-specific, predictor gains. Alternatively, the predictor gain of a partial band signal chosen as a reference is employed as the characteristic magnitude Q. In all of these cases, the value of the characteristic magnitude Q becomes higher the more accurately the predictor 46 can predict the profile of the supplied partial band signals.

The characteristic magnitude Q is compared with a predefined threshold value is by an evaluation module 68 implemented in the signal processor 12 (and shown in FIG. 4 with a dashed line). As long as the characteristic magnitude Q remains above the threshold value, the evaluation module 68 outputs a control signal S2 to that is supplied to the signal switch 66 instead of the control signal S1.

When the control signal S2 is applied (and thus when the accuracy of the prediction is sufficient) the signal switch 66 passes the partial band signals of the frequency bands 26 of the subgroup 28 to the second analytical filter bank 24. In this case, the function of the hearing device 2 of FIG. 4 again corresponds to the embodiment illustrated in FIG. 2. If, on the other hand, the control signal S2 is not applied to the signal switch 66 (meaning that the prediction does not show sufficient accuracy), the signal switch 66 instead passes the partial band signals of the frequency bands 26 of the subgroup 28 directly to the subunit 36 of the data processing unit 34 for a predefined period of time. In this case the partial band signals of all the first frequency bands 26 are again processed without any further frequency splitting process, and amplified, in particular in a frequency-specific manner. Prediction, again, does not occur in this case. Once the predefined period of time has elapsed, the second frequency splitting process, and therefore also the prediction, is reactivated in order to check the accuracy of the prediction again by using the evaluation module 68.

The speech detection module 64 is not provided in the variant embodiment described above. The signal switch 66 is, accordingly, only controlled by the control signal S2.

In a further variant embodiment of the hearing device 2 according to FIG. 4, both the speech detection module 64 and the evaluation module 68 are provided. The signal switch 66 is operated in this case both by the control signal S1 as well as by the control signal S2. The control signals S1 and S2 are preferably combined in this case with AND logic, so that the second frequency splitting process is only activated by the signal switch 66 when both the control signal S1 and the control signal S2 are present, in other words when the presence of voiced speech is detected in the input audio signal I, and when the prediction has sufficient accuracy.

In a further variant of the hearing device 2 according to FIG. 4 not shown in more detail, the characteristic magnitude Q is calculated separately for each frequency band 26 of the first subgroup 28, in particular through a determination of the respective, band-specific prediction, and compared with a respective, band-specific, threshold value. The evaluation module 68 in this case outputs the control signal S2 in a band-specific manner only for the frequency band 26 or the frequency bands 26, for which the band-specific predictor gain exceeds the respectively assigned threshold value. The signal switch 66 accordingly activates the second frequency splitting process selectively only for the frequency band 26 or the frequency bands 26 concerned. In this variant of the hearing device, the predictor 46 is preferably disposed between the signal switch 66 and the second analytical filter bank 24.

In a further variant of the hearing device 2 according to FIG. 4, not illustrated in more detail, the control signal S1 is generated in a band-specific manner if the presence of voiced speech is detected in the respective frequency band 26 by the speech detection module 64. In this case again, the signal switch 66 accordingly activates the second frequency splitting process selectively only for the frequency band 26 or the frequency bands 26 concerned.

In a further variant of the hearing device 2 according to FIG. 4, not illustrated in more detail, the predictor 46 is only switched out of the signal path connecting the microphone 6 the earpiece 8 when a value of the characteristic magnitude Q falls below the threshold value, but continues to run in the background of the signal processing (without the prediction in this case having any effect on the output audio signal O). This is, for example, achieved in that the signal switch 66 is connected, with mirror symmetry to the illustration according to FIG. 4, between the second synthetic filter bank 42 and the first synthetic filter bank 44. In this case, the predictor 46 also outputs the characteristic magnitude Q continuously when the characteristic magnitude Q does not exceed the threshold value. Switching back the signal switch after the predefined period of time has elapsed to check the accuracy of the prediction, as described for the exemplary embodiment according to FIG. 4, is not necessary in this case, and is therefore also not provided.

The components of the signal processor 12 illustrated in FIGS. 2 to 4, namely the analytical filter bank apparatus 20 with the analytical filter banks 22, 24 and, if relevant, 50, the data processing unit 34 with the subunits 36, 38 and, if relevant, 58, the synthetic filter bank apparatus 40 with the synthetic filter banks 42, 44 and, if relevant, 60, the predictor 46 and, if relevant, the predictor 62, as well as, if relevant, the speech detection module 64, the signal switch 66 and the evaluation module 68 are preferably implemented as software modules that run in the signal processor 12 when the hearing device 2 is operating. Alternatively, one or a plurality of these components are formed by non-programmable electronic circuits.

The invention is particularly clear in the exemplary embodiments described above, but is, however, not restricted to these exemplary embodiments. Rather can further embodiments of the invention be derived from the claims and the above description. In particular, the individual features of the invention described with reference to the exemplary embodiments in the context of the claims can also be combined in other ways without leaving the scope of the invention.

The following is a summary list of reference numerals and the corresponding structure used in the above description of the invention.

LIST OF REFERENCE SIGNS

2 Hearing device
4 Housing
6 Microphone
8 Earphone
10 Battery
12 Signal processor
14 Sound channel
16 Tip
20 Analytical filter bank apparatus
22 (First) analytical filter bank
24 (Second) analytical filter bank
26 (First) frequency band
28 (First) subgroup
30 (Second) frequency band
32 (Second) subgroup
34 Data processing unit
36 Subunit
38 Subunit
40 Synthetic filter bank
42 (Second) synthetic filter bank
44 (First) synthetic filter bank
46 Predictor
46' Predictor (alternative position)
50 (Third) analytical filter bank
52 (First) subgroup
54 (Third) frequency band
56 (Second) subgroup
58 Subunit
60 (Third) synthetic filter bank
62 Predictor
64 Voice detection module
66 Signal switch
68 Evaluation module
I Input audio signal
F Error
O Output audio signal
S1 Control signal
S2 Control signal
U Supply voltage

The invention claimed is:

1. A method for processing an input audio signal or an input audio signal in a hearing aid, the method comprising:

using a first analytical filter bank to divide the input audio signal into a plurality of first frequency bands in a first frequency splitting process;

using at least one further analytical filter bank to divide a first subgroup of the first frequency bands into a plurality of frequency subbands in at least one further frequency splitting process;

frequency-selectively processing or amplifying the input audio signal divided into the first frequency bands or the frequency subbands;

applying a prediction to at least one of the first frequency bands of the first subgroup or the frequency subbands derived from the first frequency bands of the first subgroup, to compensate for latency differences between the first frequency bands and the frequency subbands as a result of at least one of the frequency splitting processes; and then recombining the input audio signal, divided into the first frequency bands or the frequency subbands and frequency-selectively processed, into an output audio signal.

2. The method according to claim 1, which further comprises forming the first subgroup of the first frequency bands of a plurality of the first frequency bands having respective center frequencies being immediately adjacent and including a lowest first frequency band.

3. The method according to claim 1, which further comprises subjecting a second subgroup of the first frequency bands to the frequency-selective processing without any further frequency splitting process.

4. The method according to claim 1, which further comprises providing the first frequency bands with a consistent first bandwidth.

5. The method according to claim 1, which further comprises providing the prediction applied to the first frequency bands of the first subgroup or to the frequency subbands as a non-linear prediction.

6. The method according to claim 1, which further comprises providing the prediction applied to the first frequency bands of the first subgroup or to the frequency subbands to be adaptive during the signal processing.

7. The method according to claim 1, which further comprises analyzing the input audio signal for a presence of voiced speech in at least one of the first frequency bands or frequency subbands, and only performing at least one of the frequency splitting processes upon detecting the presence of voiced speech in the input audio signal.

8. The method according to claim 1, which further comprises ascertaining an accuracy of the prediction, and only performing at least one of the frequency splitting processes in at least one of the first frequency bands or frequency subbands, upon the accuracy of the prediction satisfying a predefined criterion.

9. A device for processing an input audio signal or an input audio signal in a hearing aid, the device comprising:

a first analytical filter bank configured to divide the input audio signal into a plurality of first frequency bands in a first frequency splitting process;

at least one further analytical filter bank disposed downstream of said first analytical filter bank and configured to divide the first frequency bands of a first subgroup of the first frequency bands into a plurality of frequency subbands in at least one further frequency splitting process;

a signal processing unit for frequency-selective processing or amplification of the input audio signal having been divided into the first frequency bands or the frequency subbands;

at least one predictor configured to apply a prediction to at least one of the first frequency bands of the first subgroup or the frequency subbands derived from the first frequency bands of the first subgroup, to compensate for latency differences between the first frequency bands and the frequency subbands as a result of at least one of the frequency splitting processes; and a synthetic filter bank apparatus disposed downstream of said signal processing unit and configured to combine the input audio signal having been divided into the first frequency bands or the frequency subbands and frequency-selectively processed into an output audio signal.

10. The device according to claim 9, wherein the first subgroup of the first frequency bands is formed of a plurality of the first frequency bands having respective center frequencies being immediately adjacent and including a lowest first frequency band.

11. The device according to claim 9, wherein said signal processing unit directly receives a second subgroup of the first frequency bands to subject the second subgroup of the first frequency bands to the frequency-selective processing without any further frequency splitting process.

12. The device according to claim 9, wherein the first frequency bands have a consistent first bandwidth.

13. The device according to claim 9, wherein said at least one predictor is a non-linear predictor.

14. The device according to claim 9, wherein said at least one predictor is an adaptive predictor during the signal processing.

15. The device according to claim 9, which further comprises:

a speech detection module configured to analyze the input audio signal for a presence of voiced speech; and a switching apparatus configured to only activate at least one of said analytical filter banks upon said voice detection module detecting the presence of voiced speech in the input audio signal.

16. The device according to claim 9, which further comprises a switching apparatus configured to activate and deactivate at least one further analytical filter bank depending on an accuracy of the prediction.

* * * * *